United States Patent [19]
Schiler et al.

[11] 4,364,179
[45] Dec. 21, 1982

[54] STATICALLY BALANCED INSPECTION PROBE ASSEMBLY

[75] Inventors: Frederick S. Schiler, Stow; Gary D. Young, Akron, both of Ohio

[73] Assignee: Portage Machine Company, Akron, Ohio

[21] Appl. No.: 202,756

[22] Filed: Oct. 31, 1980

[51] Int. Cl.³ .................................... G01B 7/28
[52] U.S. Cl. ............................... 33/174 L; 33/172 E; 33/169 R
[58] Field of Search ............ 33/174 L, 169 R, 169 C, 33/174 Q, 172 R, 172 E, 174 P

[56] References Cited

U.S. PATENT DOCUMENTS

| | | | |
|---|---|---|---|
| 3,571,934 | 3/1971 | Buck | 33/174 |
| 3,639,766 | 2/1972 | Ogden et al. | 250/202 |
| 3,660,906 | 5/1972 | Zimmerman | 33/174 L |
| 3,678,584 | 7/1972 | Dolan | 33/169 R |
| 3,756,122 | 9/1973 | Campbell | 33/172 E |
| 3,766,653 | 10/1973 | McKay | 33/174 L |
| 3,798,779 | 3/1974 | Gluck | 33/169 C |
| 3,802,086 | 4/1974 | Walker | 33/174 R |
| 3,845,561 | 11/1974 | Elsdoerfer | 33/169 R |
| 3,875,671 | 4/1975 | Vetter | 33/174 Q |
| 3,914,869 | 10/1975 | Merz et al. | 33/169 C |
| 3,922,791 | 12/1975 | Maxey, Sr. et al. | 33/172 R |
| 3,940,854 | 3/1976 | Maxey | 33/174 L |
| 3,943,633 | 3/1976 | Ruffner | 33/179.5 R |
| 3,945,124 | 3/1976 | Jacoby et al. | 33/169 R |
| 3,991,477 | 11/1976 | Zipin et al. | 33/172 E |
| 4,078,314 | 3/1978 | McMurty | 33/174 L |
| 4,084,823 | 4/1978 | McMurty | 33/174 L |
| 4,130,941 | 12/1978 | Amsbury | 33/174 L |
| 4,136,458 | 1/1979 | Bell et al. | 33/174 L |
| 4,138,823 | 2/1979 | McMurty | 33/174 L |
| 4,138,824 | 2/1979 | Ponce de Leon | 33/185 R |
| 4,142,295 | 3/1979 | Nishina et al. | 33/172 B |
| 4,153,998 | 5/1979 | McMurty | 33/174 L |
| 4,155,171 | 5/1979 | McMurty | 33/174 L |
| 4,158,919 | 6/1979 | McMurty | 33/174 L |

FOREIGN PATENT DOCUMENTS 1494945 9/1967 France ................ 33/174 L

Primary Examiner—Willis Little
Attorney, Agent, or Firm—Reese Taylor

[57] ABSTRACT

A probe assembly for use with a three axis inspection machine that is intended to measure deviation of work piece surfaces in three axes includes apparatus for statically balancing the probe in the X and Y axes and also for restricting motion of the probe to a single axis or to any combination of the axes. The probe assembly includes a universal joint arrangement on the distal end of the measuring arm of the machine permitting deflection in the X and Y axes and also includes means for permitting travel in the Z axis. The various components are interconnected so as to make it possible to selectively preclude movement in either the X, Y or Z axis or to permit movement in one, two or all three axes, as desired. Furthermore, easy release friction means are employed to permit the probe stylus holder to slide along its longitudinal axis to prevent inadvertent damage to the actual probe assembly itself. The assembly is also designed to measure deviation of the probe, either by a printout or on an analog meter.

15 Claims, 5 Drawing Figures

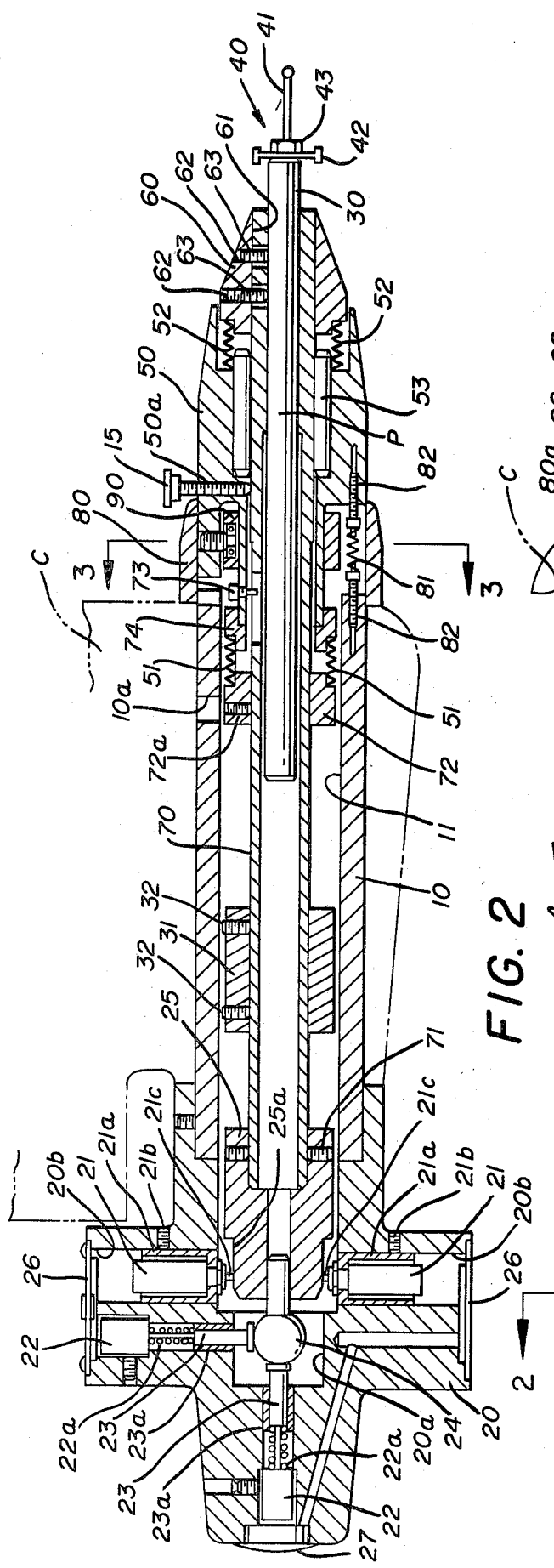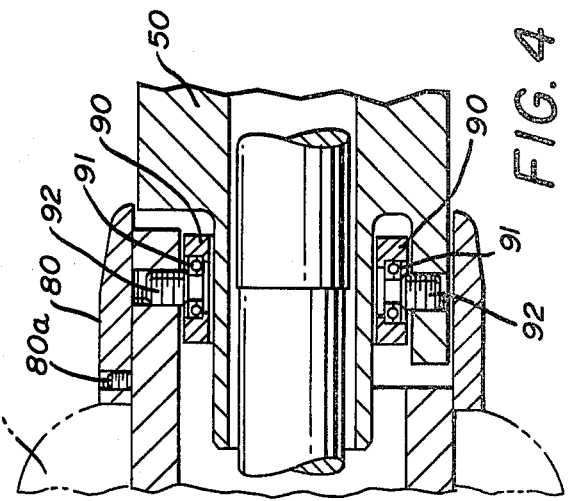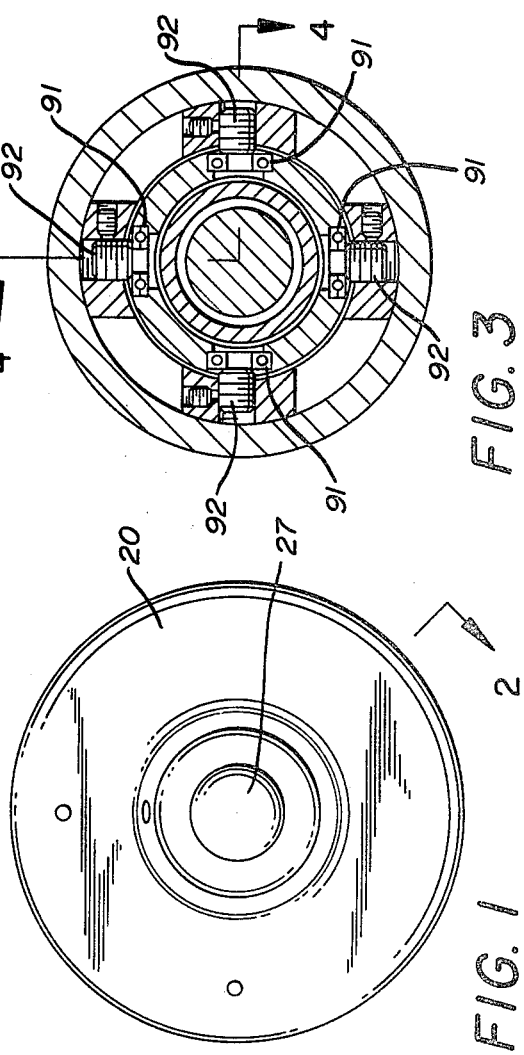

STATICALLY BALANCED INSPECTION PROBE ASSEMBLY

FIELD OF THE INVENTION

This invention relates, in general, to inspection devices for checking or measuring the dimensions of a workpiece and relates in particular to a device capable of measuring deviation in what are conventionally known as the X, Y and Z axes, while statically balancing the probe in the X and Y axes.

DESCRIPTION OF THE PRIOR ART

The prior art teaches the utilization of a variety of inspection machines and probes designed to be carried by said machines for measurement of surface deviations. Many of these are capable of measurement in what are commonly known as the X, Y and Z axes so that a workpiece can be accurately measured and inspected in all planes to insure that ll dimensions are correct.

In the prior art known to applicant there are a wide variety of different probes which are used on these machines and there are a number of patents illustrating various types of probes of this nature.

For example, in a general sense, Zimmerman U.S. Pat. No. 3,660,906 discloses an inspection probe which is capable of accurate output in three axes.

Dolan U.S. Pat. No. 3,678,584 is similar in that it permits three axis measurement while maintaining the tip of the probe is a fixed position with respect to the inspection machine to avoid using a correction factor. The probe is maintained at a common apex during rotation primarily by the utilization of a plurality of angularly disposed arms.

Walker U.S. Pat. No. 3,802,086 is also of interest in that it discloses means for measuring in various dimensions, although a non-contact gauging apparatus is employed rather than a workpiece contacting probe.

Merz U.S. Pat. No. 3,914,869 is also a device capable of three-axis measurement wherein the longitudinal axis of the probe is spaced radially from that of the spindle so as to enlarge the range of measurement.

Maxey U.S. Pat. No. 3,922,791 and Maxey U.S. Pat. No. 3,940,854 are also examples of three axis measuring devices with the '791 patent employing a single probe and the '854 patent employing three separate measuring means.

Zipin U.S. Pat. No. 3,991,477 is also a three axis measuring means employing a moire fringe concept and discloses means for maintaining the grid and index gratings in proper alignment during measurement.

McMurtry U.S. Pat. No. 4,078,314 is also representative of the prior art in that it shows a work piece measuring probe in which the stylus is capable of movement in three dimensions.

McMurtry U.S. Pat. No. 4,084,333 is a similar type probe wherein the probe is essentially supported by a plurality of leaf springs.

McMurtry U.S. Pat. No. 4,138,823 also discloses a three axis probe wherein the probe is supported in a three point support arrangement for stability but is capable of tilting about six points for improved sensitivity.

McMurtry U.S. Pat. No. 4,153,998 is another three dimensional measuring device wherein the probe or stylus is capable of being preset in a "defined rest position."

McMurtry U.S. Pat. No. 4,555,171 is similar to the McMurtry '823 patent, wherein the three point support concept is employed.

Similarly, McMurtry U.S. Pat. No. 4,158,919 is a three axes device in which the stylus is spring supported within the holder therefore.

Of general interest, in measuring devices of this general nature is Ogden U.S. Pat. No. 3,639,766, which provides only for X and Y measurement of the workpiece. Similarly, Gluck U.S. Pat. No. 3,798,779 is moveable along only one axis and provides for adjusting the position of the object detected by a measured movement along the two other mutually orthogonal axes. Essentially three probes are employed with this type device. Elsdoerfer U.S. Pat. No. 3,845,561 discloses a measuring head system in which a probe is supported by a parallelogram assembly, which is in turn supported by leaf springs and which has a fluidic feature for damping the spring system.

Somewhat similar to Jacoby U.S. Pat. No. 3,945,124, which employes a spring parallelogram for each axis and means for varying the spring force.

Further generally relevant devices of this general nature can be seen in Ponce de Leon U.S. Pat. No. 4,138,824, which utilizes a pendulum type centering device to locate the center of a workpiece. Nishina U.S. Pat. No. 4,142,295 also shows a device capable of measuring in a 360° rotational direction. Vetter U.S. Pat. No. 3,875,671 discloses a spring loaded sensing arm which is intended to gauge the extreme dimension of a non-round workpiece, such as, for example, a cam. When the extreme dimension has been engaged, the arm is disengaged from the feeler to avoid inaccuracies. Ruffner U.S. Pat. No. 3,943,633 is a spring loaded probe for a gear tester in which feeler pressure for both the left and right hand flanks are given the same value by use of a rotatable ring, including cams, which can vary the spring settings.

Bell U.S. Pat. No. 4,136,458 also discloses a probe for measuring coordinate positions on an object wherein the probe is responsive to movement in both radial and axial directions and particularly wherein axial sensing of forces both toward and away from the measuring machine can be achieved.

Of more specific relevance to the present invention is Buck U.S. Pat. No. 3,571,934 wherein mechanical means are employed to inhibit X and Y deflections. This patent dicloses means for locking out deflection when Z axis measurements are made by displacement of a mode lockout ring which seats in the housing to prevent X and Y movement. This patent, however, does not disclose any means for statically balancing the probe.

McKay U.S. Pat. No. 3,766,653 is a three axis device using a counterweight which, in its vertical position, is supported by flexible cables and in its horizontal condition is supported by an angular ring, support springs, and studs. There is, however, no means for inhibiting movement in any one or more of the X, Y and Z axes disclosed.

Amsbury U.S. Pat. No. 4,130,941 is a three-axis device in which two pivots are employed and in which a plunger can be employed to lock the first and second frames together or the second and third frames together or the first and third frames together so that they can be locked either independently or in combination to prevent relative movement therebetween.

It may be seen from the foregoing that there are a large number of machines in the prior art which deal with measurement in two or more axes. None of the art noted above, however, solves the dual object of the present invention, which is to provide a device capable of measuring deviation of surfaces in the X, Y and Z axes while statically balancing the probe in the X and Y axes and permitting selective locking of movement in any one or two directions of travel.

SUMMARY OF THE INVENTION

It has been found that provision of a probe assembly in which the probe is supported for selective multi-axis movement can accomplish the aforementioned objects.

Such a probe assembly can thus operate in any combination of one, two or three axes by the provision of mechanical interlocks which provide for selectively controlling the movement of the probe. Thus, the probe can be operated in at least seven combinations for measurement as illustrated by the following table:

| Locked Axis | Measured Movement Axis |
| --- | --- |
| X,Y | Z |
| Y,Z | X |
| X,Y | Y |
| Y | X,Z |
| Z | Y,X |
| X | Z,Y |
| None | X,Y,Z |

All of the above combinations are possible while providing for static balancing of the probe in the X and Y axes to enable the probe to move in rapid fashion in the X and Y motions without causing any significant deflection.

It is, therefore, an object of this invention to provide a probe which is capable of accurate measured movement in the X, Y and Z axes or any combination thereof while maintaining the static balance just referred to.

This object is accomplished by supporting the probe stylus on a universal joint arrangement and providing interlock means to control or limit movement in selected axes.

Accordingly, production of an improved inspection machine probe assembly of the type above described becomes the principal object of this invention, with other objects thereof becoming more apparent upon a reading of the following brief specification considered and interpreted in view of the accompanying drawings.

OF THE DRAWINGS

FIG. 1 is an end elevational view of the improved probe assembly.

FIG. 2 is a sectional view taken along the line 2—2 of FIG. 1.

FIG. 3 is an enlarged sectional end view taken along the line 3—3 of FIG. 2.

FIG. 4 is a sectional view taken along the line 4—4 of FIG. 3.

BRIEF DESCRIPTION OF THE PREFERRED EMBODIMENT

Figure 5:
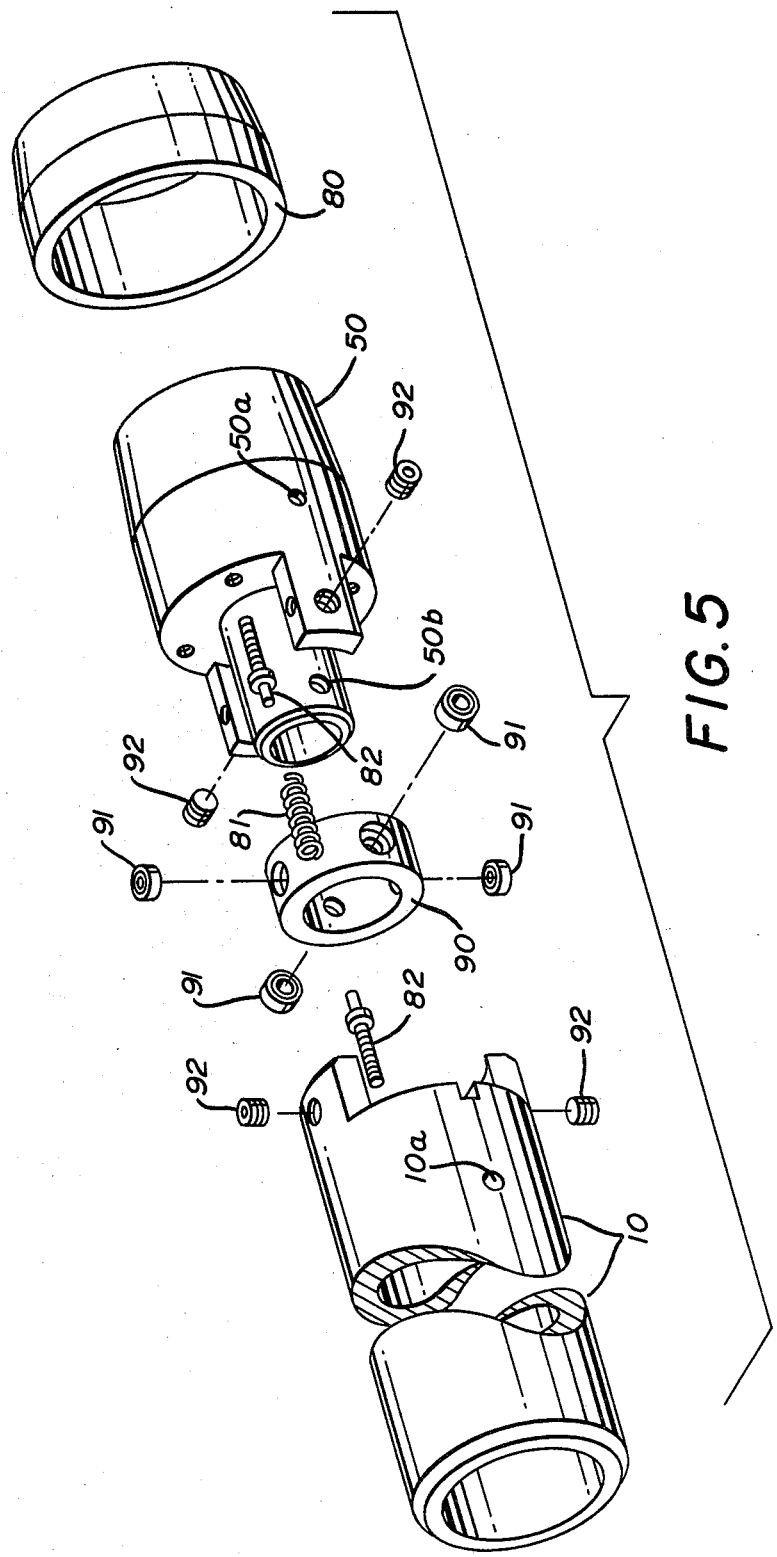
FIG. 5 is an exploded perspective view of the probe housing, pivot and bearing arrangement of the improved probe assembly.

Referring first then to FIGS. 1 and 2 of the drawings, it will be noted that the improved probe assembly is assembled into the head casting C of a conventional inspection machine. No detail of the inspection machine itself has been illustrated since the present invention may have utility in many specific machines of this general nature, some of which are disclosed in the prior art patents referred to above. In general then, it has utility in any machine designed to measure in X, Y and Z axes and to measure the deviation of surfaces in these axes.

The assembly includes an elongate hollow probe housing 10 having a through central bore 11. The housing 10 is snuggly fit and held into the head casting C by means of nylon-tipped set screws which are not illustrated in the views shown.

The assembly also includes an end cap 20 secured to one end of the housing 10 and having a centrally disposed cavity 20a. That end cap 20 carries four solenoids 21,21 (only two illustrated) disposed in radially extending bores 20b,20b and arranged in 90° relationship to each other about the common central axis of housing 10 and cap 20. The solenoids are carried by suitable supports 21a,21a which are held in the bores 20b,20b by set srews 21b,21b. These solenoids have projecting stems 21c,21c which contact the flat surfaces 25a of the trip 25 which will be described below.

Three LVDT's 22,22 are carried by end cap 20 (only two illustrated). These are Linear Variable Differential Transformers and will be referred to herein as LVDT's for the sake of brevity. However, any comparable form of electronic measuring device could be employed without departing from the present inventive concept.

The LVDT's 22,22 include spring-loaded trip rods 23,23 which are actuated by the springs 22a,22a and which reciprocate in bushings 23a,23a. The trip rods 23,23 project into cavity 20a for purposes which will be described.

A snap-in blank or cover 27 is employed to close off the end of the end cap 20. Received internally in the cavity 20a of the end cap 20 is a tooling button 24. This button is contacted by the trip rods 23,23 of the LVDT's for measurement purposes as will be described below.

Covers 26,26 are also provided on end cap 20 to close off the bores which receive the solenoids 21,21 and LVDT's 22,22 and suitable wiring (not shown) connects the solenoids to a power source and the LVDT's to readout means, neither of which are illustrated, but which are well-known to those skilled in this art.

Still referring to FIGS. 1 and 2, it will be seen that received within the central bore 11 of the hollow probe housing 10 is an elongate guide 70. This is an elongate hollow member and carries a counter weight 31, which is secured thereto by threaded ball plungers 32,32. The counter weight 31 is capable of being moved along the length of the guide 70 as required since it is held or frictionally loaded by the spring pressure of the ball plungers. This could also be accomplished by using set screws if desired. However, the frictional engagement does facilitate adjustment.

One end of the elongate guide 70 supports the trip 25 which is secured thereto by means of soft tipped set screws 71,71 so that movement of the guide 70 is carried therein. As noted above, the trip 25 has four flat surfaces 25a which are engaged by the plungers of solenoids 21,21.

Surrounding the guide 70 is a first collar 72, which is secured thereto by set screw 72a which is accessible through aperture 10a of arm 10. This first collar 72 is arranged so as to work against a second collar 74 by means of compression springs 51,51 which interconnect the collars. These springs normally urge second collar 74 away from first collar 72. Also, this second collar is not in contact with guide 70 as is the case with the first collar 72.

Received within the end of the elongate guide 70 opposite trip 25 is the probe stylus holder 30 which carries the probe assembly 40 on its projecting outboard end. This probe assembly includes the point 41, disc 42 and shoulder screw 43. It should be noted that the invention is not intended to be limited to use with the particular probe assembly 40 that is illustrated in the drawings.

At the outboard end of the arm 10, a nose 60 is employed and disposed in a press-fit relationship over the projecting end of the guide 70. This nose 60 has a central axial bore 61 so that it can be slid over the end of the guide 70. Tapped and threaded radially directed holes 62, 62 are provided in the nose 60 and these receive soft tipped set screws 63,63 which bears against the probe stylus holder 30 to hold it against axial movement and for safety purposes which will be described below.

Referring to FIGS. 2 and 5 of the drawings, it will be seen that a first pivot housing 50 is also provided in telescoping relationship with guide 70 and is joined to the nose 60 by springs 52,52 which normally urge nose 60 away from first pivot housing 50.

A ring 90 is received interiorly of the pivot housing 50 and four bearings 91,91 are carried therein with the aid of four set screws 92,92. Bearings 91,91 are set at 90° spacings and one set (0°–180°) works with housing 10 and the other set (90°–270°) works with first pivot housing 50. This structure is covered by cap 80 which is secured to housing 10 by screws 80a.

It will be noted that the connection between the arm 10 and the pivot 50 is essentially similar to a universal joint to permit the point 41 to move in the X and Y axes by permitting pivoting about pivot point P.

The pivot 50 also carries a recirculating linear ball bushing 53, which allows the sub-assembly which comprises the probe stylus holder 30, guide 70, the first collar 72, the counter balance 31, the trip 25 and the tooling button 24 to have axial motion along the longitudinal axis of the housing 10. This sub-assembly is held centrally located by means of the compression springs 52,52 working between pivot 50, nose 60, first collar 72 and second collar 74. In effect springs 51,51 and 52,52 oppose each other.

The register screw 73 is received in bore 50b of pivot 50 and works in a slot in the guide 70 to eliminate rotation between the guide 70 and the pivot 50.

The probe is designed so that it is statically balanced in the X and Y axes, enabling the inspection machine to move in rapid fashion in the X and Y axis without causing any deflection. A safety feature is also employed to prevent damage during malfunctions.

To establish the balance, the springs 51 and 52 can be adjusted by loosening screw 72a and moving first collar 72 the required amount to balance the probe in the Z axis mode. The counterbalance 31 is also set by loosening screws 32,32 and adjusting the counter balance 31 the required amount along the axis of guide 70 so that the probe is balanced about pivot point P.

In this way measurement of Z axis movement can be taken as measurement of X and Y axis movement about the pivot.

In addition to its measuring capability, the probe has the capability of restricting motion in the X, Y and Z axis to any one or two directions to travel as desired.

As noted above, the trip 25 has four flat surfaces 25a disposed at 90° intervals which are acted upon by the solenoids 21,21. These solenoids can be used to restrict movement in either the X or Y axes or in both, while still allowing Z axis motion for measurement. The screw 15 which is received in bore 50a can be tightened to restrict the Z axis motion between the pivot 50 and the guide 70 when only X or Y axis measurements are desired. Also, if desired, screw 15 could be replaced by a solenoid to automate this function.

The LVDT units 22,22 allow measurement of the movement of the tooling button 24 as it moves in the X, Y and Z directions. It will be seen that as tooling button 24 is moved in response to movement of tip 41 one rod 23,23 of one or more LVDT 22 will be moved, thus sending a signal or signals to the readout device.

The springs 81,81 are in 45° locations relative to the bearings 91,91 are used to hold the arm in a perpendicular attitude with respect to the X and Y axis travel of the machine and are adjustable by means of adjusting screws 82,82.

As noted above, soft tipped set screws 63,63 carried by nose 60 bear against the probe stylus holder 30. These will normally hold that member in place against axial movement by means of their frictional contact. However, in the event the machine is driven up against an unyielding object, for example, the fact that the probe stylus holder 30 is merely held in place against longitudinal movement by means of friction will permit it to slide axially and overcome that friction, thereby avoiding serious damage.

While a full and complete description of the invention has been set forth in accordance with the dictates of the Patent Statutes, it should be understood that modifications can be resorted to without departing from the spirit hereof or the scope of the appended claims.

What is claimed is:

1. A probe assembly for measuring deviation in X, Y and Z axes, comprising:
    (A) a housing;
    (B) an elongate guide received within said housing;
    (C) probe means carried by said guide and projecting from said housing;
    (D) universal joint means interconnecting said probe means to said housing for permitting movement in the X and Y axes;
    (E) means carried by said probe means for statically balancing said probe means in the X and Y axes;
    (F) adjustable counterbalance means carried by said guide; and
    (G) measurement means
        (1) carried by said housing and
        (2) in contact with said probe means for measuring movement thereof in the X, Y and Z axes.

2. The assembly of claim 1 further characterized by the presence of means carried by said housing and said probe means for selectively prohibiting movement of said probe means in the X, Y or Z axis.

3. An inspection probe assembly for use with a three axis inspection machine, comprising:
    (A) an elongate hollow housing releasably secured to the inspection machine;
    (B) an elongate hollow guide received within said housing;
    (C) an elongate probe stylus holder received within and projecting from one end of said guide;
    (D) universal joint means interconnecting said probe stylus holder and said housing;
    (E) adjustable counterbalance means carried by said guide; and (F) measuring means carried by said housing in contact with said guide for measuring movement of said probe stylus holder.

4. The probe assembly of claim 3 wherein said measuring means include
  (A) a tooling button carried on the opposed end of said guide; and
  (B) electronic measuring means carried by said housing and contacting said tooling button.

5. The probe assembly of claim 3 wherein a counterbalance is adjustably carried by said guide.

6. The probe assembly of claim 3 wherein said univeral joint means include
  (A) a pivot;
  (B) a ring carried by said housing; and
  (C) a plurality of bearings carried by said ring and engaging said pivot.

7. The probe assembly of claim 6 wherein
  (A) a first collar is releasably secured to said guide;
  (B) a second collar is connected to said first collar by compression spring means; and
  (C) said second collar bears against said pivot.

8. The probe assembly of claim 3 wherein said probe stylus holder is held in said guide against axial movement relatively thereof by frictional engagement.

9. The probe assembly of claim 3 wherein locking means are carried by said housing for selectively restricting movement of said guide and said probe stylus holder.

10. The probe assembly of claim 3 wherein means are carried by said guide for preventing rotation of said probe stylus holder relatively thereof.

11. The probe assembly of claim 6 wherein means are carried by said guide for preventing movement of said guide relatively of said pivot.

12. A probe assembly for measuring deviation in X, Y and Z axes, comprising:
  (A) a housing;
  (B) a probe means carried by and projecting from said housing;
  (C) universal joint means interconnecting said probe to said housing for permitting movement in the X and Y axes;
  (D) means carried by said probe means for statically balancing said probe means in the X and Y axes;
  (E) measurement means
    (1) carried by said housing and
    (2) in contact with said probe means for measuring movement thereof in the X, Y and Z axes;
  (F) means carried by said housing and said probe means for selectively prohibiting movement of said probe means in the X, Y or Z axis.

13. An inspection probe assembly for use with the three axis inspection machine, comprising:
  (A) an elongate hollow housing releasably secured to the inspection machine;
  (B) an elongate hollow guide received within said housing;
  (C) an elongate probe stylus holder received within and projecting from one end of said guide;
  (D) universal joint means interconnecting said probe stylus holder and said housing;
  (E) measuring means carried by said housing in contact with said guide for measuring movement of said probe stylus holder; and
  (F) a counterbalance adjustably carried by said guide.

14. An inspection probe assembly for use with a three axis inspection machine, comprising:
  (A) an elongate hollow housing releasably secured to the inspection machine;
  (B) an elongate hollow guide received within said housing;
  (C) an elongate probe stylus holder received within and projecting from one end of said guide;
  (D) universal joint means interconnecting said probe stylus holder and said housing;
  (E) measuring means carried by said housing in contact with said guide for measuring movement of said probe stylus holder;
  (F) said universal joint means including
    (1) a pivot;
    (2) a ring carried by said housing; and
    (3) a plurality of bearings carried by said ring and engaging said pivot;
  (G) a first collar releasably secured to said guide;
  (H) a second collar connected to said first collar by compression spring means; and
  (I) said second collar bears against said pivot.

15. An inspection probe assembly for use with a three axis inspection machine, comprising:
  (A) an elongate hollow housing releasably secured to the inspection machine;
  (B) an elongate hollow guide received within said housing;
  (C) an elongate probe stylus holder received within and projecting from one end of said guide;
  (D) universal joint means interconnecting said probe stylus holder and said housing;
  (E) measuring means carried by said housing in contact with said guide for measuring movement of said probe stylus holder;
  (F) said universal joint means including
    (1) a pivot;
    (2) a ring carried by said housing; and
    (3) a plurality of bearings carried by said ring and engaging said pivot; and
  (G) means are carried by said guide for preventing movement of said guide relatively of said pivot.

* * * * *